(12) United States Patent
Samuel

(10) Patent No.: US 9,979,212 B2
(45) Date of Patent: May 22, 2018

(54) DEVICE AND METHOD FOR CHARGE EQUALIZATION OF AN ENERGY ACCUMULATOR ARRANGEMENT

(71) Applicant: H-Tech AG, Schaan (LI)

(72) Inventor: Canadi Samuel, Bad Urach (DE)

(73) Assignee: H-Tech AG, Schaan (LI)

( * ) Notice: Subject to any disclaimer, the term of this patent is extended or adjusted under 35 U.S.C. 154(b) by 258 days.

(21) Appl. No.: 14/902,451

(22) PCT Filed: Jul. 1, 2014

(86) PCT No.: PCT/EP2014/063978
§ 371 (c)(1),
(2) Date: Apr. 12, 2016

(87) PCT Pub. No.: WO2015/000907
PCT Pub. Date: Jan. 8, 2015

(65) Prior Publication Data
US 2016/0301222 A1 Oct. 13, 2016

(30) Foreign Application Priority Data

Jul. 1, 2013 (DE) .................. 10 2013 106 872

(51) Int. Cl.
*H02J 7/00* (2006.01)
(52) U.S. Cl.
CPC .......... *H02J 7/0016* (2013.01); *H02J 7/0014* (2013.01); *H02J 7/0021* (2013.01); *H02J 2007/0096* (2013.01); *Y02T 10/7055* (2013.01)
(58) Field of Classification Search
USPC ....................................................... 320/112
See application file for complete search history.

(56) References Cited

U.S. PATENT DOCUMENTS

2009/0278488 A1* 11/2009 Choi ................... H02J 7/0016
320/103
2010/0295510 A1 11/2010 Moussaoui et al.
(Continued)

FOREIGN PATENT DOCUMENTS

JP 2005198453 A 7/2005

*Primary Examiner* — Bryce Aisaka
(74) *Attorney, Agent, or Firm* — Vorys, Sater, Seymour and Pease LLP; Vincent M DeLuca

(57) ABSTRACT

The invention relates to a device for the charge equalization of an energy accumulator arrangement, and to a method for the charge equalization of accumulator modules of an energy accumulator arrangement. In order to provide a device or a method for charge equalization of accumulator modules in an energy accumulator arrangement, in which the accumulation capacity of the accumulator modules used is efficiently utilized with low circuit complexity, a device and a method for the charge equalization of an energy accumulator arrangement (11) is proposed, wherein the energy accumulator arrangement (11) comprises at least two accumulator modules (11*a*-11*d*) electrically connected in series and the device for charge equalization comprises: a switching device (12), which is coupled to the accumulator modules (11*a*-11*d*) of the energy accumulator arrangement; a DC-to-DC converter (14), which can be coupled to the accumulator modules (11*a*-11*d*) by means of the switching device (12); a control device (13) for monitoring parameters of the accumulator modules (11*a*-11*d*) and for controlling the switching device (12) and the DC-to-DC converter (14), wherein the entirety of the series-connected accumulator modules of the energy accumulator arrangement is provided for an intermediate accumulation of charge for the charge equalization between the accumulator modules.

15 Claims, 6 Drawing Sheets

(56) References Cited

U.S. PATENT DOCUMENTS

| | | | |
|---|---|---|---|
| 2012/0049801 A1 | 3/2012 | Chang | |
| 2012/0126744 A1* | 5/2012 | Kuroda | H01M 10/44 320/107 |
| 2013/0167752 A1* | 7/2013 | Barbee | B60L 7/24 105/1.4 |

* cited by examiner

DEVICE AND METHOD FOR CHARGE EQUALIZATION OF AN ENERGY ACCUMULATOR ARRANGEMENT

The invention relates to a device for the charge equalization of an energy storage arrangement, and to a method for the charge equalization of accumulator modules of an energy storage arrangement.

Lithium-ion accumulators are increasingly used for energy storage, in particular in electric and hybrid vehicles, but also in many other areas, such as portable electronic devices. The advantage of lithium-ion accumulators is a particularly high energy density along with low volume and weight. A drawback of lithium-ion accumulators is that they are very sensitive to overcharging, so that an operation within the prescribed tolerance limits and thus a long service life of the lithium-ion accumulators can only be ensured with appropriate protective circuits. Hereinafter, lithium-ion accumulators are also referred to as lithium-ion cells.

With conventional accumulators, such as NiCd or NiMH accumulators, such protective circuits are not required, since these accumulators are very robust. In contrast, even upon a slight overload the lithium-ion accumulator is damaged in the long term. The same applies to a deep discharge of lithium ion cells, which causes lasting damage to the cell. Thus, the cells of lithium-ion accumulators need to be monitored regularly to ensure a smooth and safe operation. For this, battery management systems are used, which ensure that the individual cells are not overloaded and are not discharged excessively.

However, in addition to the functions of battery management systems charge equalization between the individual cells is needed, for which a balancer also known as a discharge compensation circuit or a compensatory controller is used, which ensures that the individual cells are optimally charged/discharged and thus ensures a protection against overcharging and excessive discharge.

Energy storage arrangements in electric and hybrid vehicles, but also in other battery-powered devices, are usually composed of a series connection of several accumulator modules, wherein one accumulator module may have a plurality of cells. The cells are usually installed in so-called accumulator packs or sheets, wherein the individual cells within these sheets can be monitored separately only in part. Within the accumulator pack or sheet, the cells are connected in series and/or in parallel. However, since several sheets or accumulator packs are connected in series, it is possible to ensure the monitoring of the accumulator modules or sheets. For this, the individual accumulator packs or accumulator modules have separate terminals, that allow the voltage to be checked and the cells located in said accumulator module to be charged and discharged individually. During a charging or discharging operation the voltage is monitored by the device for charge equalization at the terminals of the individual accumulator modules.

Conventionally, two different methods have been introduced for the required charge equalization in lithium-ion cells. In particular, during charge equalization it is monitored whether one of the accumulator modules reaches its end-of-charge voltage during the charging operation or its end-of-discharge voltage during the discharging operation. Since a plurality of accumulator modules connected in series do not have the same parameters, but are loaded with a common charging current, a different state of charge in the individual accumulator modules inevitably arises, i.e. there will be accumulator modules in the series connection of accumulator modules that reach their end-of-charge voltage faster than other accumulator modules in the series connection. This has the disadvantage that the charging operation is interrupted when one of the accumulator modules has reached its end-of-charge voltage. The same applies to the discharge operation, which is interrupted when one of the accumulator modules has reached its end-of-discharge voltage. However, since during the charging operation not all accumulator modules are fully charged, it would be advantageous to discharge the already fully charged accumulator module, for example, so as to be able to continue charging and to charge the other remaining accumulator modules fully. For this, the charge in the respective accumulator module that has reached end-of-charge voltage must be removed, which, in conventional devices for charge equalization, is carried out, for example, by means of resistors, wherein the excess charge is converted into heat via the resistor. In this manner energy is not used efficiently. During the discharging operation charge equalization is also very useful, because the discharge operation is terminated as soon as one of the accumulator modules has reached its end-of-discharge voltage otherwise, although charge, which should be made available to the user, is still present in the other accumulator modules. Without charge equalization both the charging and the discharging operation are always determined by the state of the weakest cell, thereby wasting energy or not making available energy usable.

Therefore, it is an object of the invention to provide a device and a method for charge equalization of accumulator modules in an energy storage arrangement, in which the storage capacity of the used accumulator modules is employed efficiently with low circuit complexity.

The object is achieved by a device for charge equalization of an energy storage arrangement according to an aspect of the present invention, wherein the energy storage arrangement includes at least two accumulator modules, which are electrically connected in series. The device for charge equalization is coupled to the energy storage arrangement having the accumulator modules. The device for charge equalization comprises a switching device coupled to the accumulator modules of the energy storage arrangement. Further, a DC-to-DC converter is provided which can be coupled to the accumulator modules by means of the switching device. A control device, e.g., in form of a micro-controller, is provided to monitor parameters of the accumulator modules and to control the switching operations and the DC-to-DC converter. During the charging operation of the energy storage arrangement one of the accumulator modules is coupled to the DC-to-DC converter via the switching device based on a comparison of measured parameters with a predetermined parameter. Said accumulator module is partially discharged via this coupling, wherein the charge drawn from the accumulator module is supplied to the external terminals by means of the DC-to-DC converter of the series connection of the accumulator modules.

Thus, this circuit has the advantage that the series connection of the accumulator modules is used as an energy accumulator without the requirement that excess charge energy must be converted to heat in resistors. By using the whole energy accumulator as a buffer no additional components are required for storing energy which is drawn from the individual accumulator modules in order to ensure a continuation of the charging process. Thus, the charge equalization is limited in its ability of charge redistribution only by the total capacity of the energy storage arrangement. Any external storage of energy would always be limited by the capacity of the external storage device. According to the present invention this limitation does not exist. Moreover, in the present invention any deliberate discharge by means of resistors is omitted so as to use the energy present in the accumulator modules efficiently. This also allows the omission of resistors and coils etc. required for external discharge, thereby removing the added weight of these elements. In addition, a smaller size can be achieved than in a conventional device which requires an external storage capacity for intermediate storage or elements, via which the excess charge is discharged.

Therefore, in an advantageous embodiment a predetermined parameter threshold of accumulator modules is monitored when charging the energy storage arrangement, so that, when this parameter threshold is exceeded, the corresponding accumulator module with the exceeded parameter threshold is connected to the DC-to-DC converter via the switching device. Thus, said accumulator module can be discharged at least partially via the DC-to-DC converter.

During the discharging operation one of the accumulator modules can also be coupled to the DC-to-DC converter via the switching device, wherein said accumulator module is supplied with a charge in order to increase the state of charge in said accumulator module. For this, the energy for charging said accumulator module is drawn from the overall energy storage arrangement, for which purpose a charge is drawn from the external terminals via the DC-to-DC converter and thus supplied to the accumulator module, which has reached a low state of charge.

Advantageously, during the discharge operation it is monitored whether a predetermined parameter threshold is undershot, wherein a charge, which has been drawn from the external terminals of the series connection of the accumulator modules, is supplied to the accumulator module with the undershot parameter threshold via the switching device and the DC-to-DC converter.

Preferably, the capacity value of the individual accumulator modules is used as essential parameter for controlling the device for charge equalization. Unlike the voltage monitoring the monitoring of the capacities has the advantage that the capacities of the individual accumulator modules in the respective charge and discharge cycles do not change abruptly, so that a capacity of the individual accumulator modules is known in case of an appropriate storage of the supplied current or the charge over time. Based on the capacity values of the individual accumulator modules the device can then be controlled for charge equalization.

It takes considerably less time to fully charge an accumulator module with lower storage capacity, for example due to defective cells within the accumulator module, than an accumulator module with higher storage capacity. Consequently, said accumulator module with lower storage capacity has to be discharged frequently during the charging operation. Without this controlled discharge operation the entire charging operation of the accumulator modules would be terminated and the existing storage capacity of all accumulator modules would not be used, which, e.g., in electric vehicles, has significant impact on the range and thus has to be avoided, if possible.

For this purpose, in the device for charge equalization according to the invention, after a predetermined threshold value in an accumulator module, for example, 50% or 80% of the previously known storage capacity, is reached during charging of all accumulator modules, a discharging operation for said accumulator module is started, which then leads to a controlled discharging of said accumulator module, wherein the drawn charge is resupplied via the DC-to-DC converter to the external terminals of the series connection of the accumulator modules.

However, the redistribution of the energy in accumulator modules with different capacities can be carried out continuously. Since the various storage capacities of the accumulator modules are already known before the start of the charging operation, an adapted discharging of the accumulator module(s) with lower capacity can be performed immediately.

During discharging in the capacity-controlled charge equalization the situation arises, that the accumulator module with the lower storage capacity is always discharged fastest. To avoid this, charge redistribution is started either after reaching a certain threshold value of the storage capacity or continuously, wherein the accumulator module with the lowest capacity is recharged with charge from the other accumulator modules, thus avoiding a rapid discharging of the accumulator module with the lowest storage capacity. This has the advantage that, both during the charging and during the discharging operation, the accumulator module with the lowest capacity is not brought to the limits of its operating range, so that irreversible damage to the accumulator module with the lowest capacity is avoided and the other accumulator modules can be discharged further.

In an advantageous embodiment, the threshold at which the charging or discharging operation of the accumulator module with the lowest storage capacity starts is dependent on the storage capacity of the other accumulator modules or on the state of charge of the other accumulator modules both during charging and during discharging of the accumulator modules. That is, when all accumulator modules connected in series are near the end-of-discharge voltage, a redistribution of charge from the accumulator modules with higher capacity to the accumulator module with lower capacity may be necessary, for example, when continued driving is necessary for an electric vehicle, so that, in a way, the reserve may be switched on, although this is, in principle, not advantageous for the lithium-ion accumulators in the accumulator modules.

In other situations of application a redistribution of charge might not occur and the user would then be prompted to perform a charging operation of the whole energy storage arrangement.

In another advantageous embodiment, however, as an alternative to the above-mentioned capacity-controlled charge equalization voltage-controlled, charge equalization can be performed. During the voltage-controlled charge equalization the accumulator module reaching its end-of-charge voltage first during charging is coupled to the DC-to-DC converter via the switching device, so that the excess charge can be discharged from said accumulator module and can be resupplied to the series connection of the accumulator modules via the DC-to-DC converter at the external terminals to charge the whole energy storage arrangement. The same applies to the discharging operation, wherein the accumulator module reaching its end-of-discharge voltage first is coupled to the DC-to-DC converter via the switching device for supplying current drawn from the overall energy storage arrangement at the external terminals to said accumulator module. For monitoring the accumulator modules, the control device performs a voltage measurement across the individual accumulator modules as well as a current measurement in the series connection of the accumulator modules and/or a current measurement in the supply line to the DC-to-DC converter.

The DC-to-DC converter is advantageously a DC-to-DC converter with galvanic isolation, so that there is no electrically conductive connection between a first side and a second side. In addition, the DC-to-DC converter is configured to be bidirectional, i.e. it can both draw a current from the cells as well as feed a current to said cells at its first side. The same applies to the second side, which allows a current flow towards the series connection during the charging operation. During the discharging operation a current flows from the series connection to the second side of the DC-to-DC converter, which then is resupplied to the first side of the DC-to-DC converter according to the accumulator module that is to be charged.

For this, the DC-to-DC converter performs a necessary adjustment to the voltage level and also monitors the current level so that the accumulator module to be charged or discharged is supplied with the appropriate current and the appropriate voltage, or a current with a corresponding voltage is output to the external terminals of the series connection during the charging operation. The DC-to-DC converter knows the current/voltage characteristics of the individual accumulator modules or the series connection of the accumulator modules and can therefore adjust the appropriate current and voltage values at the terminals thereof for charging or discharging.

The DC-to-DC converter may also be controlled by the controller such that the charging of either a single or multiple accumulator module(s) during the discharging operation proceeds according to a predefined voltage and current profile. Further, supplying of the charge drawn from one or more accumulator modules to the external terminals of the series connection can be carried out with a preprogrammed U/I characteristic.

Advantageously, two switches in the switching device are assigned to each accumulator module of the series connection, wherein the one switch is enabling a connection to a first terminal of the first side of the DC-to-DC converter and the second switch of the switching device assigned to said accumulator module is enabling a connection to the other terminal of the first side of the DC-to-DC converter, i.e. the accumulator module may be coupled to the terminals of the DC-to-DC converter via the two switches to draw charge from or to supply charge to the accumulator module via the DC-to-DC converter.

In addition, the DC-to-DC converter is also connected to the control device in order to monitor and program the DC-to-DC converter accordingly or to read values from said DC-to-DC converter and to process them in the control device.

The switching device comprises two switches for every accumulator module. These switches can be controlled individually by the control device. Each switch can be driven separately by the control device and can open or close accordingly in order to enable a connection of the accumulator module to the one or the other terminal of the DC-to-DC converter. The control device further also has a terminal for receiving external control signals. Via this bidirectional terminal or a separate terminal data or signals can be output to external devices. In addition to these terminals, the control device is also provided with a terminal which detects the voltage values of the individual accumulator modules, preferably constantly. For this purpose, a plurality of A/D converters which perform the voltage measurement at the individual accumulator modules may be provided in the control device. To monitor the current values in both the series connection of the accumulator for modules as well as in the supply line to the DC-to-DC converter additional amperemeters are connected, which are connected to the control device and thus can transmit the measured current values to the control device.

In an advantageous embodiment, during the discharge operation, the accumulator module with the lowest storage capacity is always recharged as much as the remaining capacity of at least one of the other accumulator modules allows. That is, when one of the accumulator modules has a lower capacity, when reaching 80% of the capacity of the other accumulator modules, the accumulator module with the lower storage capacity could always be charged to said 80% of the accumulator modules, wherein the redistribution of charge from the accumulator modules with higher capacity to the accumulator module with lower capacity also results in a discharge of the accumulator modules with higher capacity, so that they do not have 80% of their capacity after the charge redistribution operation. The advantage of this capacity-controlled charge equalization method is that an accumulator module with a lower storage capacity at a state of charge of, for example, 80% of capacity has a higher voltage than the accumulator modules with higher capacity. Consequently, when discharging of the accumulator modules is continued, the accumulator module with a lower storage capacity is at a higher state of charge, and thus is not discharged so quickly that it must immediately be recharged again.

The object is also achieved by a method for charge equalization of accumulator modules in an energy storage arrangement, wherein the energy storage arrangement includes at least two accumulator modules electrically connected in series. The method comprises the steps of: measuring parameters of the accumulator modules and comparing them with predetermined parameters; during a charging operation of the energy storage arrangement and when exceeding a predetermined parameter in an accumulator module, coupling said accumulator module with the exceeded parameter to a DC-to-DC converter and discharging said accumulator module at least partially, and supplying the drawn charge to the overall series connection of all accumulator modules; during a discharging operation and when undershooting a predetermined parameter in an accumulator module, coupling said accumulator module with the undershot parameter to the DC-to-DC converter and supplying charge to said accumulator module with the undershot parameter, wherein the supplied charge is drawn at the external terminals of the series connection.

A particular advantage of the capacity-controlled charge equalization is that the only limit for intermediate storage of energy for the redistribution of charge or the charge equalization is the total capacity of the energy storage arrangement. Unlike in a device for charge equalization working with an external energy storage, in this case, it is not necessary to provide an additional energy storage. Moreover, any additional energy storage would be limited in its capacity in addition to its weight and volume, so that a charge redistribution process would always be limited to the capacity of the additional energy storage.

Another advantage is that discharging and charging proceed virtually simultaneously, i.e. the operation of the device or the vehicle does not have to be interrupted for charge equalization.

Moreover, in an advantageous embodiment it is possible to use several DC-to-DC converters, so that a charge redistribution process may be performed with several accumulator modules simultaneously.

In addition, the device for charge equalization according to the present invention has the advantage that for several DC-to-DC converters simultaneous charging and discharging of corresponding accumulator modules is possible.

In addition, it is not possible to start the charging or discharging operation based on the storage capacity before a predetermined threshold, for example, 5% capacity deviation, is reached.

With the embodiment according to the invention it is possible that the DC-to-DC converter does not perform the charging or discharging operation of an accumulator module with lower capacity up until the full charging or discharging operation is completed. The embodiment according to the invention is also configured such that the DC-to-DC converter sequentially handles a plurality of accumulator modules in a multiplexed way, so as to ensure optimized charge equalization.

With the advantageous embodiment, it is also possible that, during the charging operation and for known capacities of the accumulator modules connected in series, the accumulator module with the lowest capacity is not charged first, i.e. the other accumulator modules with higher capacity are charged up to a certain threshold and then the accumulator module with lower storage capacity is connected and charged. Since the accumulator module with lower capacity cannot be removed from the series connection, the charge redistribution or the "non-charging" is carried out in the following manner: the accumulator module with lower storage capacity is discharged immediately during charging, so that storage capacity cannot build up therein and the connection of said accumulator module to the DC-to-DC converter is only interrupted when the accumulator modules with higher storage capacity have exceeded a certain threshold value. Preferably, this threshold value is as high as the difference in the storage capacities of the accumulator modules. That is, with four accumulator modules, one of which being at only 80% storage capacity, first the three accumulator modules with higher storage capacity are charged to 20%, so that when reaching 20% the accumulator module with lower storage capacity is connected and then charged to 100% along with the others.

The manner of the charging operation may preferably be carried out by control signals from an external system. In an electric vehicle this can, for example, be the driving condition or the temperature conditions. The decision, if the accumulator module with lower capacity is not charged initially or discharged at 50% or 80% or any other predetermined threshold, may in particular depend on whether a discharge operation is to be expected in the near future. This means that if, for example, an electric vehicle is charged overnight in the garage it can be assumed that the vehicle is not moved during the charging operation and a discharging operation of the energy accumulator device starts. In such a case the accumulator module with low capacity is not charged initially and the charging is only started or the simultaneous discharging of said accumulator module is only terminated after reaching, e.g., 20% of the state of charge of the other accumulator modules. Otherwise, unless it is ensured that the charging can be carried out fully, it is advantageous to also immediately start charging the accumulator module with lower capacity, since in case of a discharging operation the accumulator module with lower capacity then has a charge and can supply it, so that a charge redistribution from the other accumulator modules does not have to start immediately.

With the device for charge equalization according to the invention charge equalization while driving is also possible, so that stopping is not necessary for the usual charge equalization. The immediate equalization of the storage capacities is possible because the storage capacities are known and a simultaneous discharging of an accumulator module and charging of the series connection of the accumulator modules or a charging of a single accumulator module and a discharging of the series connection of the accumulator modules are possible via the bidirectional DC-to-DC converter.

In the following the present invention will be explained in more detail with reference to figures. In the drawings.

Hereinafter, the invention will be described with reference to the figures by way of example. The embodiments shown in the figures are not restrictive. Features described in one figure of an embodiment but only shown in the figure in another embodiment are also applicable for this embodiment and have not been described redundantly for purposes of clarity.

Figure 1:
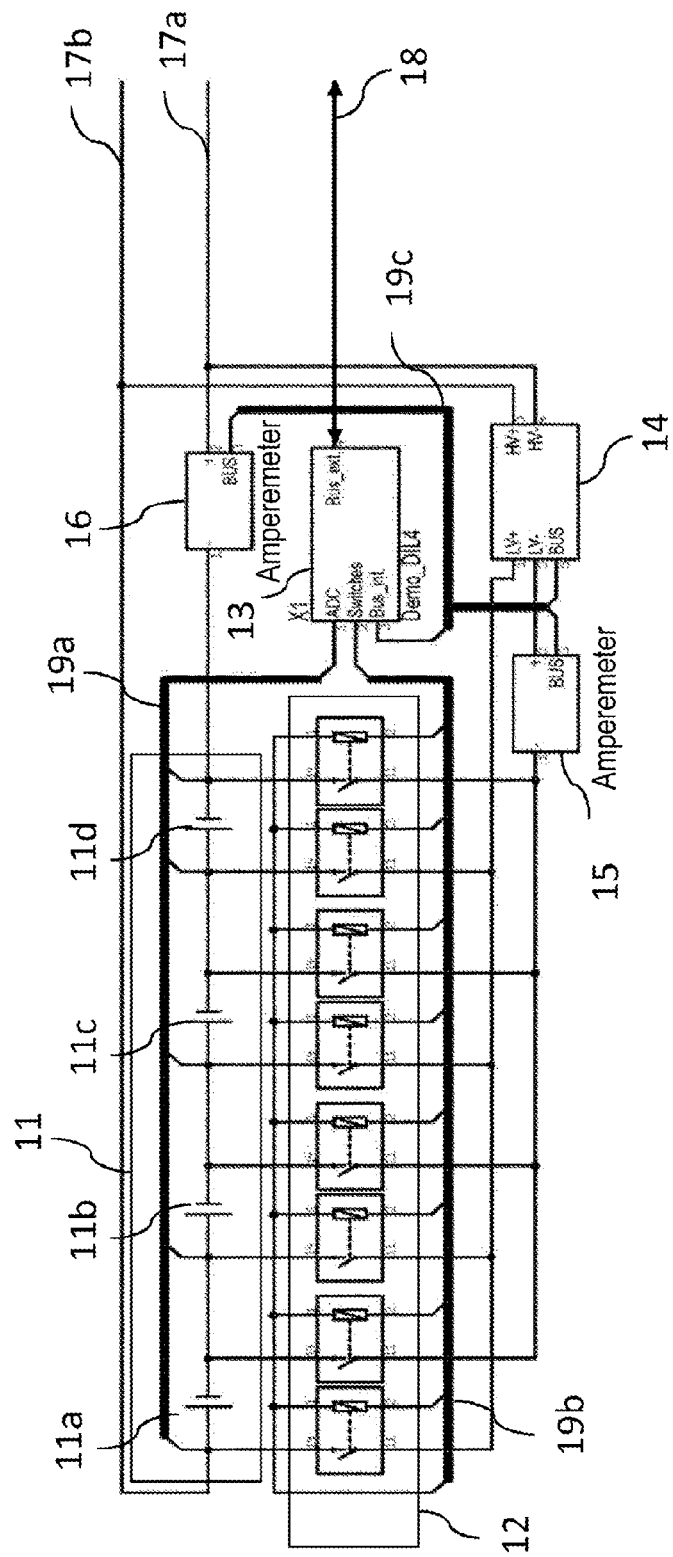
FIG. 1 shows a schematic diagram of an energy accumulator device with a DC-to-DC converter according to the invention.

FIG. 1 shows a schematic diagram of a first embodiment of an energy accumulator device 11 having a DC-to-DC converter 14 according to the invention. In this embodiment, the energy accumulator device 11 includes four accumulator modules 11a, 11b, 11c, 11d connected in series. The accumulator modules 11a to 11d are preferably lithium-ion accumulator modules. However, other accumulator modules or batteries such as nickel metal hydride and nickel cadmium accumulator modules are used. The series connection may consist of at least two accumulator modules. An accumulator module may also be referred to as an accumulator pack or sheet. An accumulator module is composed of a plurality of individual memory cells. Within the accumulator module, the cells may be connected both in series and in parallel or in combinations thereof.

The circuit arrangement according to FIG. 1 further includes, in addition to the energy accumulator device 11, a switching device 12, a DC-to-DC converter 14 and a control device 13. Furthermore, current measuring devices 15 and 16 are present.

The accumulator modules 11a to 11d each have terminals that aren't specified in detail in FIG. 1. To each of these terminals at least one controllable switch of the switching device 12 is connected. The switching device 12 includes a plurality of controllable switches, preferably each switch being assigned to one of the terminals of each accumulator module. That is, the accumulator module 11a is connected to a controllable switch of the switching device 12 at both its positive terminal and its negative terminal. The same applies to the accumulator modules 11b to 11d, which each are connected to a controllable switch of the switching device 12 at both the positive terminal and the negative terminal thereof.

On its other side, the switching device 12 is connected to the DC-to-DC converter 14, in particular to the first side of the DC-to-DC converter 14, which in this embodiment is referred to as a low voltage side (low-voltage). Specifically, the positive terminal of the first accumulator module 11a can be coupled to the positive terminal of the first side of the DC-to-DC converter 14 via a switch of the switching device 12, wherein the negative terminal of the accumulator module 11*a* is connected to the negative terminal of the first side of the DC-to-DC converter 14 via another switch in the switching device 12. This applies analogously to the other accumulator modules 11*b*-11*d*.

According to the embodiment in FIG. 1 an amperemeter 15 is coupled into the supply line to the negative terminal of the first side of the DC-to-DC converter 14 in order to measure the current from at least one accumulator module connected to the negative terminal of the first side of the DC-to-DC converter 14 via the switch of the switching device 12. However, the amperemeter 15 may also be incorporated in the positive supply line of the first side of the DC-to-DC converter 14.

Another component of the circuit of FIG. 1 is the control device 13 having a plurality of ports. The control device 13 is connected to the accumulator modules 11*a* to 11*d* via the bus line 19*a* in order to detect voltage values of the accumulator modules 11*a* to 11*d*, provide them to the control device 13 and convert said voltage values in ADCs therein in digital voltage values, so as to use these voltage values of the individual accumulator modules 11*a* to 11*d* for the control of the charging or discharging operation of the energy accumulator device 11. Another terminal of the control device 13 is connected to the bus 19*b*, via which the individual switches in the switching device 12 are controlled. The switches in the switching device 12 can be configured as transistor as well as relay or any other suitable type of controllable switch, which can be controlled by the control device 13. Via the bus line 19*b*, the switches can be controlled individually or in groups by the control device 13. Furthermore, the control device 13 includes a terminal for detecting the current values and is connected to the amperemeters 15 and 16 for this purpose.

Via another bus system 19*c*, the control device 13 is coupled to the amperemeters 15, 16 and a DC-to-DC converter 14.

In addition, in the circuit arrangement of FIG. 1, the DC-to-DC converter 14 is provided, which includes a first side referred to in this embodiment as a low-voltage side with positive and negative terminals. The DC-to-DC converter 14 also has a second side is referred to as a high-voltage side with positive and negative terminals.

Moreover, the DC-to-DC converter 14 includes a control terminal via which the DC-to-DC converter 14 can be controlled by the control device 13 and values can be transferred from the DC-to-DC converter 14 to the control device 13.

Furthermore, an amperemeter or ammeter 16 is provided in the circuit of FIG. 1, which is located in the supply line 17*a* for detecting the current flowing through the accumulator modules 11*a* to 11*d*. This amperemeter 16 is also connected to the control device 13 via the control line 19*c* in order to transmit the detected current values to the control device 13.

Either a load (not shown in the present circuit) is applied to the external terminals 17*a* and 17*b* or corresponding currents to charge the energy accumulator device from an external power source such as a house connection or a charging station are supplied via these terminals 17*a* or 17*b*. The control device 13 also includes an external input and output 18 via which the controller 13 can communicate with external devices. For example, the control device 13 may be connected to an onboard computer of a vehicle or to a central control device of the apparatus in which the energy accumulator device 11 is arranged. Via this port 18 the control device can receive 13 commands for charging or discharging. However, charging profiles can also be transmitted to the control device 13 and/or values of the individual accumulator modules can be transferred from the control device 13 to a higher-level controller.

The DC-to-DC converter 14 is used to receive a DC voltage of, for example, the cells of the accumulator module 11*a* which are connected to the first side of the DC-to-DC converter 14 via the two left-side switches of the switching device 12, and to convert said voltage to a different DC voltage suitable for charging the overall energy accumulator device. For example, since a lithium ion cell has a charge voltage of ca. 4.2 V, it is possible to supply a voltage of 4.2 V to the first side of the DC-to-DC converter 14, wherein a voltage for the four accumulator modules 11*a*-11*d* connected in series is output on the output side on the second side of the DC-to-DC converter 14 for charging the four accumulator modules 11*a*-11*d* connected in series, i.e. max. 4×4.2 V. When outputting the voltage a predetermined charging profile, for example, a series of charge pulses are output at the second side of the DC-to-DC converter 14 in order to optimally charge the four accumulator modules 11*a*-11*d* connected in series. Charging with an excessive voltage may result in damage to the accumulator modules 11*a*-11*d*. Therefore, in the DC-to-DC converter 14, a controlled conversion of the input voltage to an appropriate output voltage is performed, wherein the output current is controlled in addition to the voltage. This control is performed by the control device, wherein the currently detected voltage values, current values, temperature values and external demand profiles are considered.

This conversion of the input voltage to the output voltage is performed accordingly in the DC-to-DC converter, so that the DC-to-DC converter supplies the amount of charge drawn from the accumulator module 11*a* with suitably adjusted voltage to the external terminals 17*a* and 17*b* of the energy accumulator device 11, thereby charging the entirety of the accumulator modules 11*a* to 11*d* in the energy accumulator device 11.

During the discharging operation in which a load is connected to the external terminals 17*a* and 17*b* the DC-to-DC converter 14 is operated inversely to the charging operation. In this case, upon reaching a discharge voltage or a defined threshold value of the storage capacity of an accumulator module, said one accumulator module is connected to the first side (low voltage) of the DC-to-DC converter 14, wherein the charge to be supplied to the almost discharged accumulator module is drawn at the external terminals 17*a* and 17*b* from the overall energy accumulator device 11.

Hence, a voltage of, e.g., 14 V is supplied to the DC-to-DC converter 14 on the second side. This voltage is stepped down and the corresponding charge is supplied to the accumulator module which has dropped below the predefined threshold value (voltage or storage capacity) in order to charge said accumulator module so that it has a voltage value or state of charge above the defined threshold.

In the circuit arrangement shown in FIG. 1, a DC-to-DC converter 14 is provided which, with suitable control of the switches in the switching device 12, is also capable to simultaneously discharge one, two or three accumulator modules and to supply, in turn, the drawn charge to the overall energy accumulator device at the external terminals. That is, when not only one accumulator module is having a reduced storage capacity, but three accumulator modules are having a lower storage capacity than a fourth accumulator module, it is possible to discharge the three accumulator modules in parallel during a charging operation in order to allow a continued charging of the fourth accumulator module. However, it is also possible to discharge the three accumulator modules with lower storage capacity in sequence and to supply the drawn charge to the overall energy storage arrangement 11 at each of the external terminals. During sequential discharging of a plurality of accumulator modules with lower storage capacity during the charging operation of the energy storage arrangement, discharging of the individual accumulator modules can be carried out for a predetermined time per accumulator module. However, the discharging operation of a single accumulator module during charging of the energy accumulator device via the switching device 12 and the DC-to-DC converter 14 may also be carried out until said accumulator module with lower storage capacity has dropped below a defined voltage value or state of charge.

Figure 2:
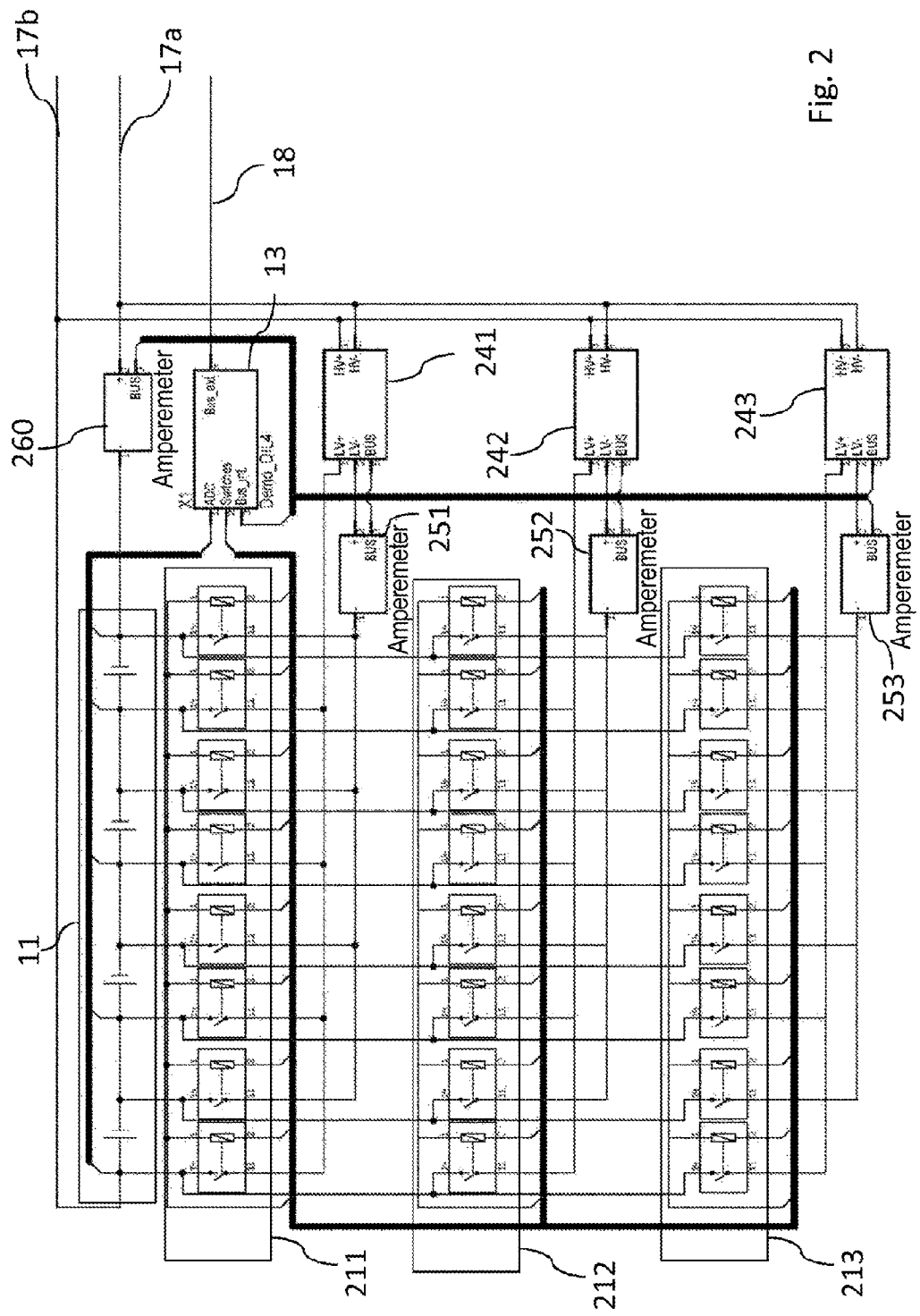
FIG. 2 shows a schematic diagram of an energy accumulator device with a plurality of DC-to-DC converters according to the invention.

In another embodiment according to FIG. 2 an energy accumulator device 11 is provided which can be coupled with three switching devices 211, 212 and 213. Each switching device 211, 212, and 213 is connected to a DC-to-DC converter 241, 242 and 243, respectively. The control device 13 controls each of the switches in the switching devices 211, 212 and 213 in order to connect accumulator modules 11*a*-11*d* of the energy accumulator device 11 with one or more of the DC-to-DC converters 241, 242 and 243 accordingly. To each switching device 211, 212, 213 and each DC-to-DC converter 241, 242, 243 in the supply line on the low voltage side an amperemeter 251, 252 and 253 is assigned in order to measure the current input in or output from the DC-to-DC converters 241, 242 or 243. At the external terminals 17*a*, 17*b* on the supply line side an amperemeter or ammeter 260 is provided in order to measure the current supplied to the overall energy storage arrangement 11. The control device 13 can also be coupled to external devices via an input or output 18. By means of the circuit shown in FIG. 2, it is possible to simultaneously discharge or charge three of the accumulator modules 11*a*-11*d* during the charging or discharging operation of the energy accumulator device 11, wherein the discharging/charging of a single accumulator module during the charging/discharging operation of the overall energy accumulator device 11 is controlled by a single DC-to-DC converter 241, 242, 243, respectively. With the circuit of FIG. 2, it is also possible to perform charging and discharging of different accumulator modules via different DC-to-DC converters at the same time. Thus, it is possible, for example, to discharge an accumulator module which has reached its predetermined end-of-charge voltage or state of charge to allow continued charging of other accumulator modules.

At the same time, it is possible to charge an accumulator module, which is below a predetermined state of charge or a critical capacity threshold or voltage threshold, although another accumulator module is discharged by another DC-to-DC converter 241, 242, 243, since it has reached its end-of-charge voltage or a predetermined threshold value of capacity or voltage, for example.

The more common case for which the circuit shown in FIG. 2 is provided is, however, that the accumulator modules in the energy accumulator device 11 have different capacities, and, consequently, exceed or undershoot predetermined end-of-charge voltages or end-of-discharge voltages or predetermined threshold values at different times, such that each accumulator module may be discharged or charged individually by a DC-to-DC converter 241, 242 and 243.

The particular advantage of the circuit shown in FIG. 2 is that the charge equalization process can proceed more quickly than in a circuit according to FIG. 1, in which a DC-to-DC converter 14 has to be used sequentially for different accumulator modules, thereby extending the time required for the equalization of the states of charge of the individual accumulator modules.

Figure 3:
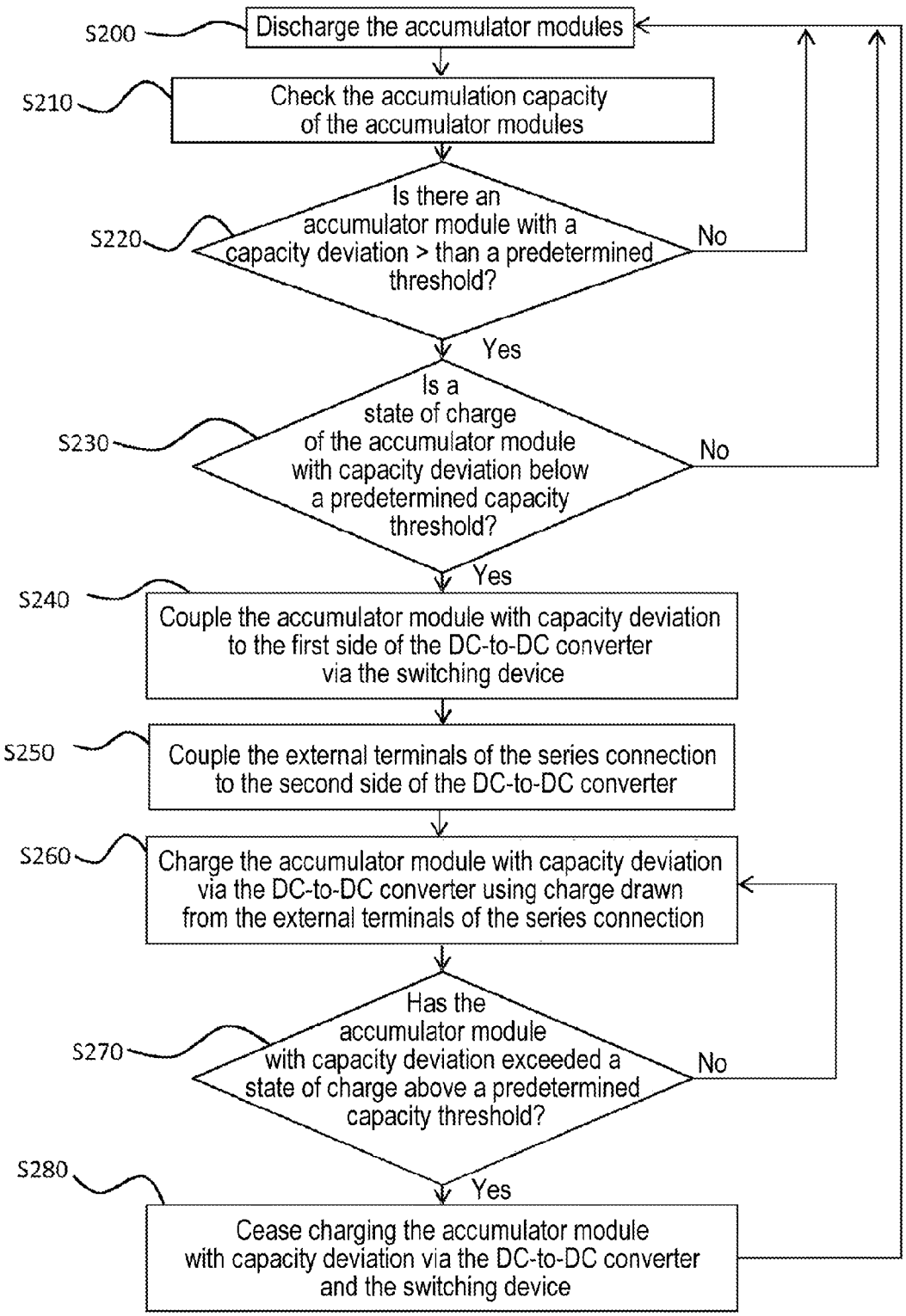
FIG. 3 is a flow chart for a capacity-controlled discharging according to the present invention.

FIG. 3 shows a flow chart for a discharging operation of the energy accumulator device. A typical discharge operation is, for example, driving or accelerating an electric vehicle or operating a battery-powered combination drill.

In step S200, the discharge operation is started by operating the accelerator pedal or the trigger, for example. Thereafter, in step S210, the storage capacity of the individual accumulator modules is checked. A capacity measurement or determination of the capacity is possible based on the voltage curve over the state of charge of the accumulator modules, so that the capacity can be inferred from the voltage.

In step S220, after detecting the individual storage capacity of the accumulator modules, it is determined, if there is an accumulator module in the series connection of accumulator modules, which differs in its storage capacity from the storage capacities of the other accumulator modules. When there is a predetermined capacity deviation among the individual accumulator modules, it is determined in step S230, if a state of charge of the accumulator module with capacitance deviation is below a predetermined capacity threshold. That is, it is determined, if said accumulator module is more discharged than the others. If an accumulator module has only 80% of its normal capacity, for example, discharging of the energy storage arrangement empties it more quickly than the other accumulator modules with higher capacity.

However, if no capacity deviation is determined in step S220, the accumulator modules 11*a* to 11*d* are continually discharged and checked by the controller 13 until a deviation of the storage capacity of the individual accumulator modules arises after several charging and discharging cycles.

In step S230 it is checked if any of the accumulator modules 11*a*-11*d* with lower storage capacity has a state of charge below a certain threshold capacity, i.e. a state of charge of, for example, only 30% of its storage capacity. If this threshold is not undershot, a return discharging the accumulator modules in S200 is carried out. If a state of charge of the accumulator module with lower storage capacity is below a predetermined capacity threshold, said accumulator module is connected to the first side of the DC-to-DC converter 14 by means of the switching device 12. For this purpose, the two switches connected to the terminals of the respective accumulator module are closed, so that said accumulator module is then connected to the positive and negative terminals of the DC-to-DC converter 14 on the first side of the DC-to-DC converter 14. For this, the controller may send a command via the bus line 19*a* to the appropriate switch. In step S250 the terminals of the second side of the DC-to-DC converter 14 are coupled to the external terminals 17*a*, 17*b*. In the DC-to-DC converter 14 the positive and negative terminals can be activated both on the first and on the second side. In particular, the voltage on the input or output side needs to be adjusted accordingly in the DC-to-DC converter 14. In step S260, the accumulator module with the capacitance variation is charged via the DC-to-DC converter 14 with a charge drawn from external terminals 17*a*, 17*b* of the series connection. The energy accumulator device 11 overall has a higher state of charge than the single accumulator module, which has a lower storage capacity and a state of charge below a predetermined capacity threshold, such that a portion of the charge of the overall energy accumulator device 11 is removed and supplied to said one accumulator module in order to recharge said one accumulator module and to raise its state of charge above a corresponding capacity threshold, so as to ensure a longer discharge operation of the overall energy accumulator device and to preserve said one accumulator module, since it is known that lithium-ion cells in particular degenerate more when reaching the end-of-discharge voltage than when they are operated in a medium voltage range without being lead to the predetermined end-of-discharge or end-of-charge voltage, respectively.

In step S270, it is checked if the respective accumulator module, which previously has been charged, now has a state of charge that is higher than the predetermined capacity threshold. As long as this capacity threshold is not exceeded, the process continues with step S260. If the capacity threshold is exceeded, charging of the respective accumulator module with capacitance deviation via the DC-to-DC converter 14 and the switching device 12 is terminated.

The process can then be continued with another accumulator module. But it may also occur, that, if the discharge operation of the energy accumulator device is continued and the energy accumulator device is continually discharged, said one accumulator module with lower storage capacity is once again falling below the predetermined capacity threshold more quickly, so that a renewed recharging of the accumulator module with lower storage capacity is required. Then the sequence as shown in FIG. 3 is repeated.

Figure 4:
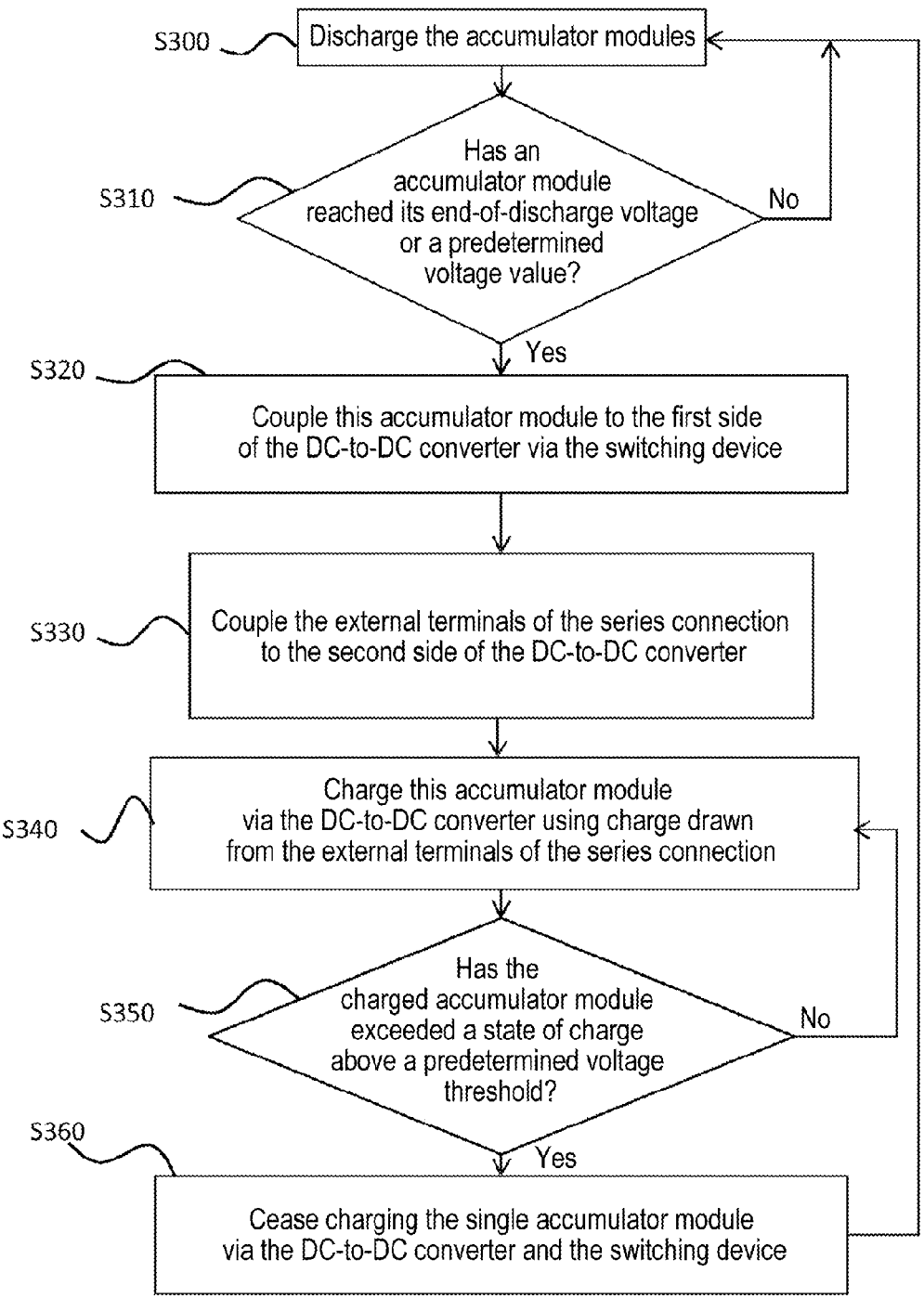
FIG. 4 is a flow chart for a voltage-controlled discharging according to the present invention.

In the flow diagram according to FIG. 4 another method of discharging the accumulator modules 11a to 11d of an energy storage arrangement 11 is shown, wherein for the decision, as to whether an individual charging of a single accumulator module is necessary or not, a voltage monitoring is performed. In step S300 the discharging operation of the accumulator modules 11a to 11d of the energy accumulator device 11 is started by moving an electric vehicle having the energy storage arrangement 11 or putting a battery-powered drill into operation, for example. In step S310, it is checked if any of the accumulator modules of the energy storage arrangement have reached their end-of-discharge voltage or a predetermined voltage value. The end-of-discharge voltage is the voltage that is specified in the data sheet of the manufacturer of the cell, which is 2.5 V for lithium-ion cells, for example. A predetermined voltage value may differ from the value of the end-of-discharge voltage of the data sheet and be higher or lower. As long as none of the accumulator modules have reached their end-of-discharge voltage or the predetermined voltage value, the method remains in the loop between the steps S300 and S310. After reaching the end-of-discharge voltage or a predetermined voltage value, the process proceeds to step S320, in which the accumulator module, which has reached the end-of-discharge voltage or a predetermined voltage value, is connected to the first side of the DC-to-DC converter 14 via the switch in the switching device 12.

Simultaneously or subsequently, the external terminals 17a and 17b of the energy storage arrangement 11 of the series connection of the accumulator modules are connected to the second side of the DC-to-DC converter 14 in order to draw, in step S340, a charge at the external terminals 17a and 17b of the energy storage arrangement 11 and to adjust this charge/voltage by means of the DC-to-DC converter 14 such that it can be supplied to the accumulator module to be charged, which has reached the end-of-discharge voltage or the predetermined voltage value in step S310. The charging operation of the single accumulator module with a charge drawn at the external terminals of the series connection is continued until the charged accumulator module has a state of charge above a predetermined voltage threshold in step S350. If the accumulator module, which has reached a predetermined voltage value in step S310, has exceeded another predetermined voltage value or the same voltage value, the charging operation of the accumulator module via the DC-to-DC converter 14 and the switching device 12 is terminated.

The main advantage of the capacity-controlled charging or discharging is that the charging/discharging performance of the energy storage arrangement is maintained over a very long period of time despite a capacity loss of one or more accumulator modules. Moreover, the full capacity of all cells may be used therewith. In conventional systems the usable capacity of all good accumulator modules would be reduced to the capacity of the poorest accumulator module.

Figure 5:
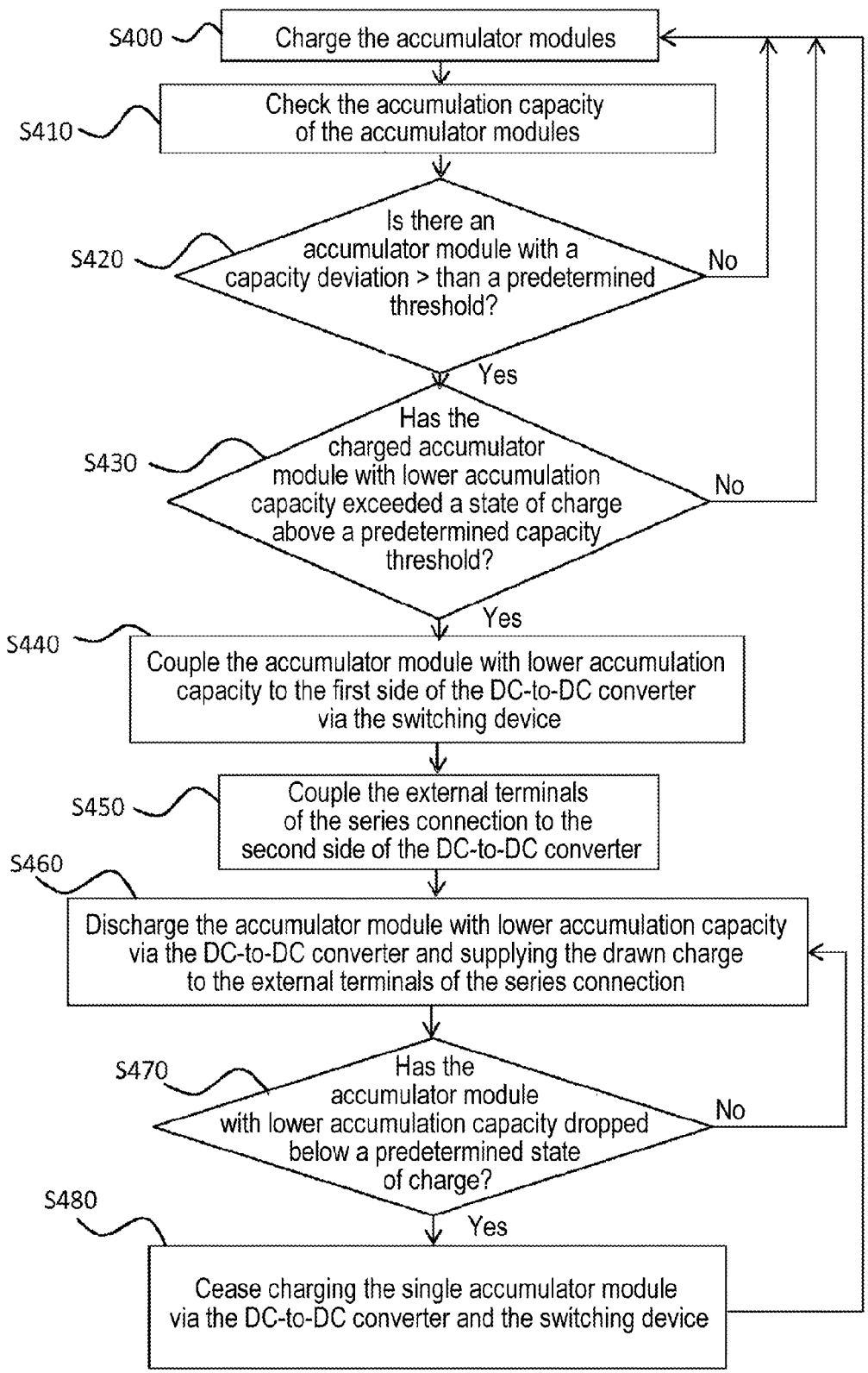
FIG. 5 is a flow chart for a capacity-controlled charging according to the present invention.

In FIG. 5 the charging operation of the energy storage arrangement 11 is described, wherein the decision as to whether one of the accumulator modules 11a-11d has to be discharged in order to ensure a continued charging of the other accumulator modules is based on the storage capacity of the individual accumulator modules.

In step S400 the charging operation of the accumulator modules 11a-11d is started, wherein the energy storage arrangement 11 is connected to an external energy source. In step S410 the storage capacity of the individual accumulator modules 11a to 11d is checked. This can, for example, be an initialization process or a comparison of the parameters of the individual accumulator modules stored in the control device 13. Since the storage capacity of the individual accumulator modules is not changing abruptly, but only over a number of charging and discharging cycles, the current capacity of each accumulator module is known to the control device 13. An accumulator module has a maximum storage capacity of 10 Ah, for example. However, it is not uncommon that an accumulator module has an storage capacity of, for example, only 8 Ah after several charging and discharging cycles due to degeneration of cells or failure of individual cells in an accumulator module.

In the control device 13 which is provided with a memory module or a memory function the supplied currents are recorded per unit of time. Thus, the control device 13 knows the storage capacity of each individual accumulator module. To determine the state of charge of an accumulator module in percent, the voltage across the individual accumulator modules is detected. Since, as is described in FIGS. 1 and 2, the control device 13 is connected to the accumulator modules 11a to 11d via the bus line 19a and can thus monitor the current voltage value of the individual accumulator modules both during the charging or discharging operation, the control device 13 may determine the state of charge of the accumulator module on the basis of the voltage value of the individual accumulator modules. If the storage capacity of the individual accumulator modules has been checked in step S410 and the process continues to step S420, it is determined whether any of the accumulator modules has a capacity deviation that is greater than a predetermined threshold. The threshold value can be specified in percentage terms. It can also be absolute. Thus, it is possible that a positive decision is made in step S420, when there is a capacity deviation of, for example, 5% in comparison to the other accumulator modules. However, in the case of similar accumulator modules with an storage capacity of 10 Ah, it is also possible to determine that the process proceeds to step S430 when one of the accumulator modules has an storage capacity of 9.5 Ah. That is, in step S420 it is determined based on the stored values of the individual accumulator modules whether charge equalization between the accumulator modules is required based on the storage capacity.

In step S430 the accumulator module with lower storage capacity is checked regarding its state of charge, wherein it is checked whether said accumulator module has a state of charge that is higher than a predetermined capacity threshold. Since an accumulator module having a lower storage capacity in principle has achieved a state of charge above a certain capacity threshold more quickly, there is a need to realize that said accumulator module with lower storage capacity has to be discharged accordingly, in order to ensure continued charging of the other accumulator modules with normal storage capacity.

When a state of charge above a predetermined capacity threshold is reached at the accumulator module with lower storage capacity, said accumulator module with lower storage capacity is connected to the first side of the DC-to-DC converter 14 via the switching device 12 and the external terminals 17a and 17b of the series circuit of the accumulator modules are connected to the second side of the DC-to-DC converter 14 in steps S440 and S450. For example, when during the charging operation of the accumulator modules the accumulator module with lower storage capacity has reached a state of charge of, for example, 80%, it is thus possible to start discharging said accumulator module via the DC-to-DC converter, so as to ensure continuous charging of the other accumulator modules, so that all accumulator modules have been filled to 100% at the end of the charging operation.

After the accumulator module with lower storage capacity has been connected to the first side of the DC-to-DC converter on one side and to the external terminals of the series connection of the energy storage arrangement on the other side in steps S440 and S450, discharging of the accumulator module with lower storage capacity via the DC-to-DC converter 14 can be started (step S460), wherein the charge drawn from said accumulator module with lower storage capacity is in turn supplied to the entirety of the accumulator modules at the external terminals 17a and 17b.

In step S470, it is checked whether the accumulator module with lower storage capacity has dropped below a predetermined state of charge. As long as this is not the case, the discharging operation is continued. If the accumulator module with lower storage capacity has dropped below a predetermined state of charge, the discharging of said single accumulator module via the DC-to-DC converter and the switching is device is terminated (S480) and the accumulator module with lower storage capacity is charged along with the other accumulator modules via the external terminals 17a, 17b by the external energy source.

Figure 6:
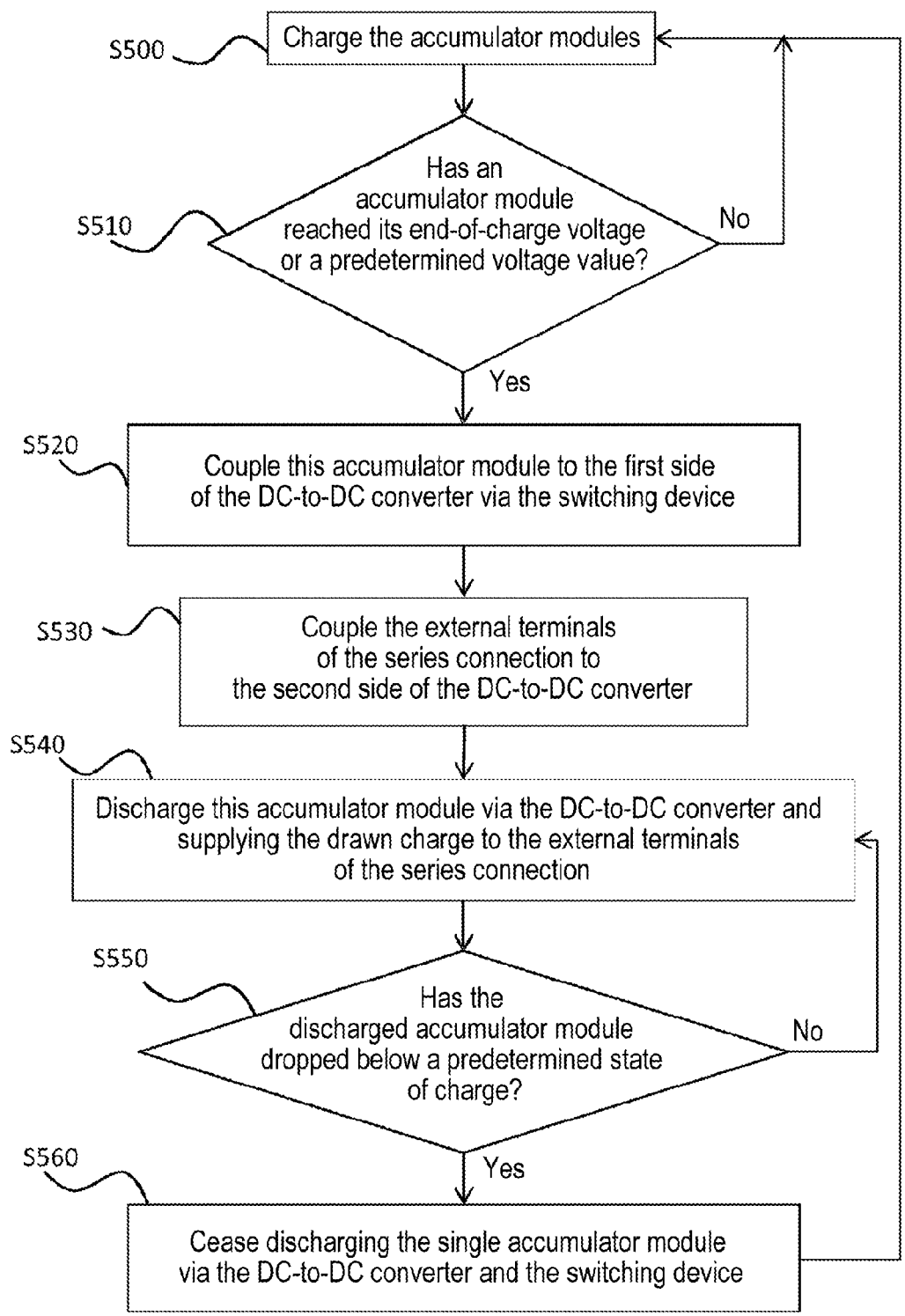
FIG. 6 is a flow chart for a voltage-controlled charging according to the present invention.

In FIG. 6 a charging operation of the energy storage arrangement 11 having the accumulator modules 11a to 11d is described, wherein only the end-of-charge voltage or a predetermined voltage value is checked for deciding whether a corresponding accumulator module has to be discharged or not. After the charging operation of the accumulator modules of the energy storage arrangement 11 is started in step S500, it is checked in step S510 if one of the accumulator modules has reached its end-of-charge voltage or a predetermined voltage value. If this is the case, the process proceeds to step S520, wherein said accumulator module, which has reached, for example, its end-of-charge voltage or the predetermined voltage value, is connected to the first side of the DC-to-DC converter 14 via the switching device 12.

Subsequently or simultaneously, the second side of the DC-to-DC converter 14 is connected to the external terminals 17a, 17b of the series connection of the accumulator modules in step S530, so that by means of this connection discharging of the respective accumulator module via the DC-to-DC converter can be started (S540), wherein the drawn charge is converted in the DC-to-DC converter with respect to current and voltage and is in turn supplied to the entirety of the accumulator modules at the external terminals 17a and 17b.

This discharging operation of the respective accumulator module is continued until the accumulator module has dropped below a predetermined state of charge (S550). When it has dropped below said state of charge, and consequently a uniform charging of all the accumulator modules of the series connection can be carried out, the discharging operation of said single accumulator module via the DC-to-DC converter 14 and the switching device 12 is stopped in step S560, wherein the switches in the switching device 12 connected to the terminals of the respective accumulator module are opened and therefore the connection to the DC-to-DC converter 14 is interrupted.

Hereinafter, an example will be described with reference to voltage and capacity values. In a series connection of 4 accumulator modules, which would nominally each have a capacity of 10 Ah, only 3 accumulator modules have 10 Ah while one of the four accumulator modules has a capacity of only 8 Ah. Initially, all accumulator modules are empty. Then a charging operation begins. In principle, charge equalization may also start when charging starts, i.e. the accumulator module with the lower capacity of 8 Ah is discharged or not charged (i.e. discharged via the DC-to-DC converter) until the other accumulator modules are sufficiently charged so that all accumulator modules are charged to their fullest capacity at the same time without additional charge equalization (in the example charge equalization is performed until the three accumulator modules have been charged with 2 Ah more than the accumulator module with 8 Ah).

During the discharging operation, that is, three of the accumulator modules have 10 Ah and one has 8 Ah, charge equalization can be started immediately when discharge starts. Since the charge equalization is generally slower than the overall charging/discharging, charge equalization must be started in good time, i.e. not when the accumulator module with lower capacity already comes close to the threshold voltage (predetermined voltage or end-of-charge voltage). Otherwise, the maximum total charging/discharging performance has to be reduced to the charge equalization, thereby limiting the performance while driving an electric vehicle, for example.

However, the charge equalization may not begin too early if the activity could change in the near future, i.e. from charging to discharging and vice versa. That could mean that the accumulator module with lower capacity is kept at 0 Ah during charging until the other accumulator modules have reached 2 Ah. Then, when all of a sudden energy is retrieved (discharging), the total charging/discharging performance has to be reduced to the charge equalization again.

In each case the control device will decide if a state change may or may not occur in the near future, and will start or delay the charge equalization accordingly. In one example the charge equalization can only be started when the accumulator module with lower capacity reaches 50% of its capacity. During discharging the situation is analogous.

On one hand, the advantage of the present invention is that a circuit arrangement and a method for charging or discharging of accumulator modules is provided, in which no additional intermediate storage arrangement is required for the equalization process. In particular, this is achieved by using a bidirectional DC-to-DC converter, which can simultaneously control a charging and a discharging operation, thereby allowing a continuing charging of the entirety of the accumulator modules, while one of the accumulator modules, which, for example, has reached a state of charge above an storage capacity or a end-of-charge voltage, may be discharged. By the utilization of the entirety of the accumulator modules as intermediate accumulator, it is thus possible to efficiently use the charge without, for example, converting it to heat in a resistor circuit.

At the same time it is possible, for example, to use the charge during the charging operation such that it is reused for charging the not yet fully charged accumulator modules.

Thus, it is achieved, that during the discharging operation equalization of the states of charge is carried out until all the accumulator modules have reached a corresponding threshold value and thus the accumulator module, which reached its threshold or its end-of-charge voltage first, does not cause a termination of the discharge operation.

The usage of the entire energy storage arrangement as an intermediate accumulator has to the further advantage that no extra weight is required in order to realize a charge equalization process. In addition, the charge equalization process between the accumulator modules is limited only by the storage capacity of the entire energy storage arrangement and not by the storage capacity of a separate intermediate accumulator.

The invention claimed is:

1. A device for charge equalization of an energy storage arrangement, said energy storage arrangement comprising a series connection of at least two electrically connected battery modules, said device for charge equalization comprising:
   a switching device coupled to said battery modules of said energy storage arrangement;
   a DC-to-DC converter that is coupleable to said battery modules via said switching device; and
   a control device configured to monitor parameters of said battery modules and to control said switching device and said DC-to-DC converter, wherein said series connection of battery modules of said energy storage arrangement is used as an intermediate storage of charge for charge equalization between said battery modules, wherein said control device controls a charging and/or discharging operation of said energy storage arrangement based on storage capacity values of the respective battery modules, and
   wherein said DC-to-DC converter comprises a galvanic isolation between a first side of said DC-to-DC converter and a second side of said DC-to-DC converter, wherein said first side of said DC-to-DC converter is connected to said switching device and said second side.

2. The device for charge equalization as set forth in claim 1, wherein a battery module with the lowest capacity with respect to the storage capacity of the other battery modules is charged or discharged.

3. The device for charge equalization as set forth in claim 1, wherein a battery module, which during a charging operation of said energy storage arrangement first exceeds a state of charge above a predetermined storage capacity value, is connected to said DC-to-DC converter via said switching device in order to draw charge from said battery module and to supply the drawn charge back to said external terminals of the series connection of the battery modules.

4. The device for charge equalization as set forth in claim 1, wherein a battery module, which during a discharging operation of said energy storage arrangement first reaches a state of charge below a predetermined storage capacity value, is connected to said first side of said DC-to-DC converter, wherein said second side of said DC-to-DC converter is connected to external terminals of said series connection of said battery modules in order to draw a charge from said energy storage arrangement via said external terminals, wherein said charge is supplied to said battery module first reaching said state of charge via said DC-to-DC converter and said switching device.

5. The device for charge equalization as set forth in claim 1, wherein a battery module which first reaches an end-of-charge voltage or a predetermined voltage value during a charging operation of said energy storage arrangement, is connected to said DC-to-DC converter via said switching device in order to draw a charge from that battery module and to supply the drawn charge back to said series connection of the battery modules.

6. The device for charge equalization as set forth in claim 1, wherein a battery module, which first reaches an end-of-discharge voltage or a predetermined voltage value during a discharging operation of said energy storage arrangement, is connected to said DC-to-DC converter via said switching device in order to supply a charge to that battery module, wherein the supplied charge was drawn from said series connection of battery modules via external terminals of the series connection of the battery modules.

7. The device for charge equalization as set forth in claim 1, wherein the storage capacity values of said battery modules are determined based on voltage values and a current value per unit of time and stored in a memory unit.

8. The device for charge equalization as set forth in claim 1, wherein said control device detects respective voltages across individual battery modules and current flow in said series connection of battery modules.

9. The device for charge equalization as set forth in claim 1, wherein said switching device includes at least two controllable switches for each battery module, wherein one of said switches is configured to connect a positive terminal of a battery module to a first terminal of said first side of said DC-to-DC converter, and the other of said controllable switches is configured to connect a negative terminal of said battery module to a second terminal of said first side of said DC-to-DC converter.

10. The device for charge equalization as set forth in claim 1, wherein said DC-to-DC converter includes said first side having two terminals and said second side having two terminals and a control terminal, wherein said control terminal is configured to monitor and program said DC-to-DC converter.

11. The device for charge equalization as set forth in claim 1, wherein said control device is configured to perform at least one of the following functions:
   controlling switches of said switching device;
   receiving signals for current and voltage measurement;
   controlling said DC-to-DC converter;
   receiving external control signals;
   outputting data to external devices;
   storing parameters and capacity values of said battery modules.

12. The device for charge equalization as set forth in claim 1, wherein during a discharging operation, a battery module with the lowest storage capacity with respect to the storage capacity of the other battery modules is charged up to a remaining capacity of at least one battery module with a higher storage capacity.

13. The device for charge equalization as set forth in claim 1, wherein the storage capacity of a battery module is determined based on charging currents and charging times of previous charging cycles.

14. A method for charge equalization of battery modules in an energy storage arrangement comprising a series connection of at least two electrically connected battery modules, the method comprising:

measuring parameters of said battery modules and comparing the measured parameters with predetermined parameters;

detecting storage capacity values of said battery modules;

performing a charge equalization of states of charge between said battery modules by using said series connection of battery modules as an intermediate storage based on the detected storage capacity values during a charging operation of said energy storage arrangement, by upon determining that a predetermined parameter has been exceeded, coupling a battery module having at least one measured parameter exceeding a predetermined parameter to a DC-to-DC converter and at least partially discharging that battery module, wherein said DC-to-DC converter includes a first side having two terminals and a second side having two terminals and a control terminal, wherein said control terminal is configured to monitor and program said DC-to-DC converter, and supplying the drawn charge to said series connection of battery modules.

15. A method for charge equalization of battery modules in an energy storage arrangement comprising a series connection of at least two battery modules, the method comprising:

measuring parameters of said battery modules and comparing the measured parameters with predetermined parameters;

detecting storage capacity values of said battery modules;

performing a charge equalization of states of charge between said battery modules by using said series connection of battery modules as an intermediate storage based on the detected storage capacity values during a discharging operation of said energy storage arrangement, by upon determining that a predetermined parameter has been undershot, coupling a battery having at least one measured parameter undershooting a predetermined parameter to a DC-to-DC converter and supplying charge to that battery module, wherein the supplied charge is drawn at external terminals of the series connection, wherein said DC-to-DC converter includes a first side having two terminals and a second side having two terminals and a control terminal, wherein said control terminal is configured to monitor and program said DC-to-DC converter.

* * * * *